United States Patent [19]

Marco

[11] 3,899,096

[45] Aug. 12, 1975

[54] REFORMED PLASTIC ARTICLE AND METHOD OF MANUFACTURE

[75] Inventor: Leslie Stephan Marco, Oakland, Ill.

[73] Assignee: Illinois Tool Works Inc., Chicago, Ill.

[22] Filed: Aug. 22, 1973

[21] Appl. No.: 390,649

Related U.S. Application Data

[62] Division of Ser. No. 232,456, March 7, 1972, Pat. No. 3,787,547.

[52] U.S. Cl. .................................. 215/31; 215/335
[51] Int. Cl. ........................................... B65d 41/08
[58] Field of Search ............. 215/31, 274, 276, 335

[56] References Cited
UNITED STATES PATENTS

| 406,542 | 7/1889 | Silva | 215/335 |
|---|---|---|---|
| 2,794,574 | 6/1957 | McGeorge | 215/335 X |
| 3,343,579 | 9/1967 | Clark | 215/335 X |
| 3,434,615 | 3/1969 | Barletta | 215/276 |
| 3,603,472 | 9/1971 | Lecinski | 215/335 X |

Primary Examiner—Donald F. Norton
Attorney, Agent, or Firm—Robert W. Beart; Edward L. Benno

[57] ABSTRACT

A composite container with a light weight and relatively thin plastic body portion having an open neck portion around which is fixed a separate and rigid annular ring member with threads or other fastening means for cooperative attachment of a closure member thereto; the container body portion being initially a plastic preform with an outward flange rim at the open end and the annular ring member being assembled with the preform to a position around the neck portion and in engagement with the flange rim; and with the preform then reformed with the body wall expanded beneath the adjacent end of the ring member to trap the same in engagement with the flange rim.

There are conventional plastic glass jars and bottles with relatively thick walls and resultantly of relatively increased weight to provide a threaded finish of sufficient strength to properly secure and seal a threaded cap thereon. Also, there are containers of various types having threaded members of various types separately secured thereto. In some of these types, as where plastic materials are employed, there is a mold formation of the parts with a welding of the materials of the container and threaded members; in others, there is mechanical interlocking between the container and the threaded member.

1 Claim, 4 Drawing Figures

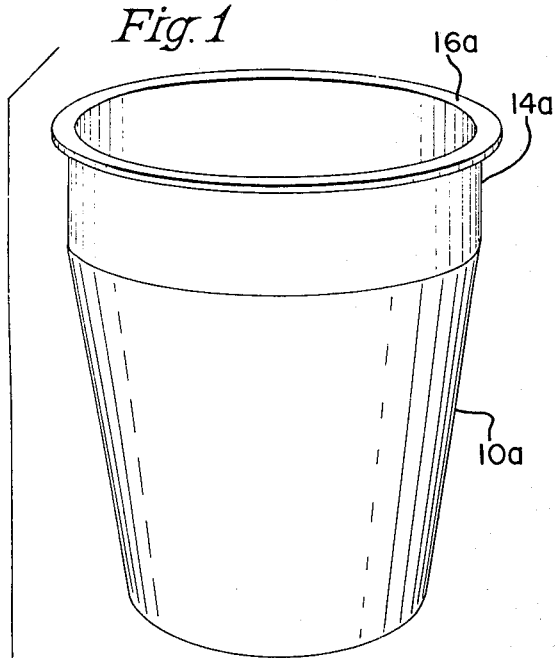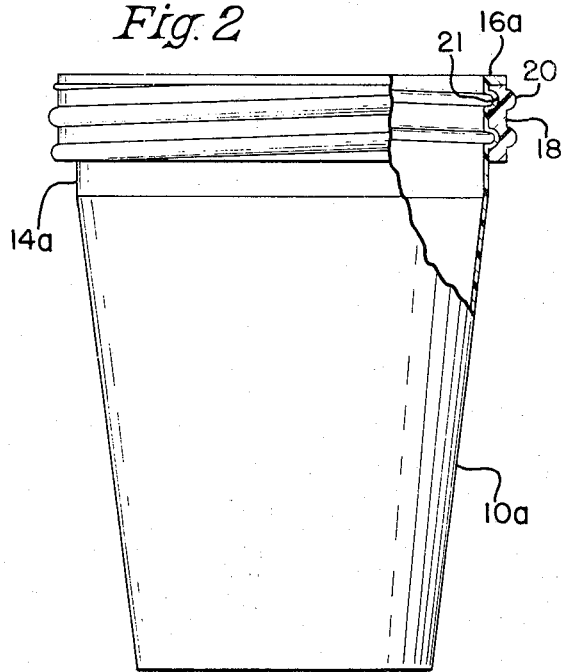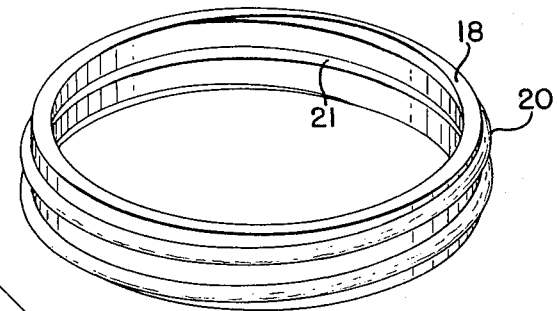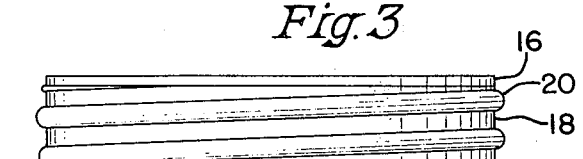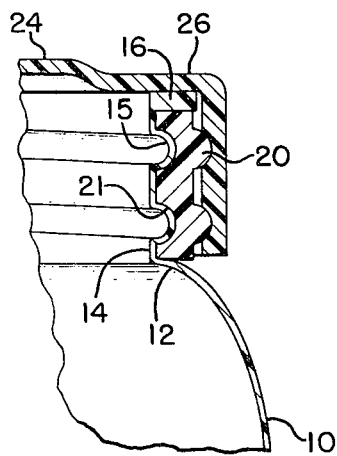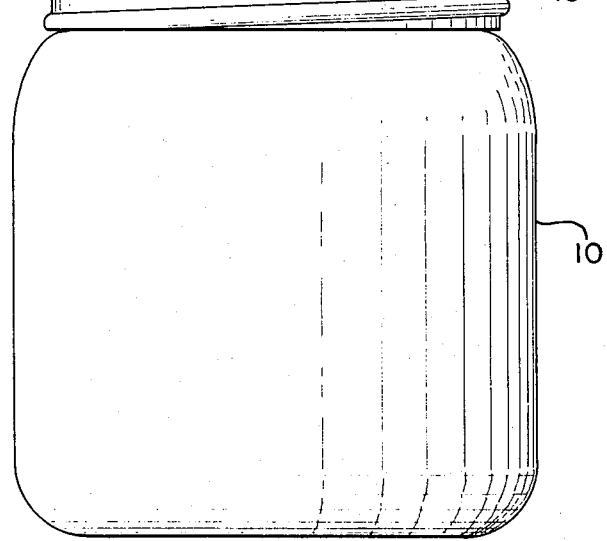

REFORMED PLASTIC ARTICLE AND METHOD OF MANUFACTURE

This is a division of application Ser. No. 232,456, filed Mar. 7, 1972, now U.S. Pat. No. 3,787,547.

According to the present invention, there is provided a composite container with a necked body wall and a ring member secured around the neck and provided with thread or other formation for attachment of a closure cap thereto; and an object of the present invention is to provide such a container which is light weight and thin walled but having sufficient strength in the ring member for proper and secure attachment of a closure cap.

Another object of the invention is to provide a composite container substantially of the above type wherein the ring member is mechanically trapped around the body neck against axial or rotational movement relative thereto, such as by interfitment between the neck material and recess means interiorly of the ring member, or by entrapment of the ring member between a portion of the body wall and a flange rim at the top of the neck, such flange rim serving also as a sealing surface for an applied closure cap.

The invention still further aims to provide a method of forming a composite container substantially of the above type by providing the container body wall as a thin walled plastic preform with the upper edge in engagement with the flange, and thereafter reforming the container to expand beneath the lower edge of the ring member to trap the same as a reinforcement around the neck in position for receiving a closure cap for the composite container assembly.

In the accompanying drawing:

FIG. 1 is an exploded view showing the container body preform and the ring member prior to assembly;

FIG. 2 is a side view, partly in section, showing the assembled preform body and ring member;

FIG. 3 is a side elevation of the assembled ring member and container body after reshaping of the preform of FIG. 2; and FIG. 4 is an enlarged fragmentary section showing the interlocking of the body wall and ring member with a closure cap applied thereto.

Reference will first be made to FIGS. 3 and 4 for a description of the composite container assembly which includes a relatively thin walled and light weight body portion 10 and a relatively rigid ring member 18 assembled thereto. The wall of the body portion is domed inwardly, as at 12, to underlie the bottom edge of the ring member and to merge with a neck portion 14 having at the upper end thereof an outward flange rim or lip 16 which overlies the upper edge of the ring member. The outer surface of the ring member 18 is provided with threads 20 or other suitable fastener formations for cooperation with similar threads or other formations on the depending skirt 22 of a closure cap 24 including a peripheral portion 26 with the undersurface thereof in sealing engagement with the flange rim 16 when the container is closed. As particularly shown in FIG. 4, the ring member 18 is trapped between the domed body portion 12 and the undersurface of the flange rim 16. In forming the ring member 18, as by injection molding techniques, recesses 21 may be provided on the inner surface thereof in complement to the external threads 20, and upon assembly of the ring member to the neck 14, portions 15 of the neck will have been forced into interengagement with the recesses 21 and thus further interlock the neck and the ring member against relative rotation as when the cap 24 is applied or removed.

Turning to FIGS. 1 and 2, the method of assembly of the ring member to the body will be described. The material for the container body is selected from those plastic materials, as styrene, which can be blown or thermoformed to relatively thin wall thicknesses for light weight but which then may be of insufficient strength to provide integral thread formations for proper securing of a closure cap thereto. Thus, as shown in FIG. 1, the material of the container body is shaped to a preform with an inverted frusto-conical body portion 10a and an upper cylindrical portion 14a which is to become the neck portion 14 with the flange 16a projecting radially outwardly around the open end. The ring member 18 is relatively thick and rigid and may be of nylon, or even metal, for sufficient rigidity to threadedly receive a closure cap. This ring member is telescopically associated with the preform to the position around the cylindrical portion 14a, as shown in FIG. 2, and in abutment with the undersurface of the flang 16a. It will be noted that the indentations 21 face the outer surface of the body wall 14a, and it is to be understood that these indentations may assume formations other than complemental to the threads 20 during molding or otherwise forming the ring member. At the assembly stage of FIG. 2, the parts are associated with suitable apparatus for heating, reblowing or thermo-forming the body of the container to reshape the same to the configuration of FIG. 3 with the domed portion 12 underlying the bottom edge of the ring member, as particularly shown in FIG. 4, to trap the ring member between this domed portion at the undersurface of the flange 16. At the same time, the material of the neck portion 14a will be forced, as at 15, outwardly into locking engagement with recesses 21, or such other recess configurations as may be provided on the inner surface of the ring member. There is thus provided a composite container including a thin walled and light weight body portion and a relatively rigid threaded ring member serving to reinforce the body neck and provide firm purchase for a closure independent of the material selected for the body portion. As an example, styrofoam for the body portion is relatively inexpensive and easily blown into a thin walled container and is of sufficient resiliency such that the flange form 16 provides a resilient sealing surface for the applied closure cap which may itself be formed of relatively rigid polyethylene to cooperate with the threads on the ring member. For the body material, as styrofoam or the like, the temperature required for reblowing or other thermo-forming, may be in the neighborhood of 250°F. and the material of the ring member, if of plastic, as nylon or the like, is selected to withstand a higher temperature, in the neighborhood of 350° F, without degradation. Thus, the reshaping of the preform body can be accomplished without affecting the material of the ring member or collar member which may serve as a part of the mold surface in re-shaping the body wall, particularly the neck portion thereof against the ring member. The expansion of the body wall, particularly the domed portion snugs the ring or collar member against the undersurface of the flange rim.

I claim:

1. A composite container assembly comprising a container portion and an annular relatively rigid ring portion, said container portion being formed from a thin-walled plastics material with insufficient rigidity to be formed with properly functioning cap attaching formations for a closure cap, said container portion comprising a body section, a neck section integrally formed on the upper end of said body section, and a flange section integrally formed on the upper end of said neck section, said body section immediately below said neck section having a shoulder extending substantially radially outwardly of said neck section, the outer diameter of said ring portion being less than the outer diameter of said shoulder of said body section, said ring portion disposed circumferentially about said neck section with the lower end of said ring portion vertically abutting said shoulder, said ring section having external cap attaching formations extending outwardly thereof, said flange section immediately overlying and positioned against the upper end of said ring portion, the outer diameter of said flange section being substantially less than the radially outward extension of said external cap attaching formations, said flange section being sufficiently flexible to provide a seal between an applied closure cap and the interior of said container portion, indentations formed in the inner surface of said ring portion, and portions of said neck section indented into said indentations to lock said ring portion against rotation relative to said neck section.

* * * * *